(12) United States Patent
Hurewitz

(10) Patent No.: US 11,546,186 B2
(45) Date of Patent: Jan. 3, 2023

(54) AUTOMATIC DEVICE ORCHESTRATION AND CONFIGURATION

(71) Applicant: BBY Solutions, Inc., Richfield, MN (US)

(72) Inventor: Matthew Hurewitz, Hemet, CA (US)

(73) Assignee: BBY Solutions, Inc., Richfield, MN (US)

(\*) Notice: Subject to any disclaimer, the term of this patent is extended or adjusted under 35 U.S.C. 154(b) by 29 days.

(21) Appl. No.: 17/099,458

(22) Filed: Nov. 16, 2020

(65) Prior Publication Data

US 2021/0075635 A1    Mar. 11, 2021

Related U.S. Application Data

(63) Continuation of application No. 15/886,519, filed on Feb. 1, 2018, now abandoned.

(51) Int. Cl.
| | |
|---|---|
| *H04L 12/28* | (2006.01) |
| *H04W 4/70* | (2018.01) |
| *G06N 20/00* | (2019.01) |
| *H04L 12/46* | (2006.01) |

(52) U.S. Cl.
CPC ......... *H04L 12/2814* (2013.01); *G06N 20/00* (2019.01); *H04L 12/2816* (2013.01); *H04L 12/4625* (2013.01); *H04W 4/70* (2018.02); *H04L 2012/2841* (2013.01)

(58) Field of Classification Search
None
See application file for complete search history.

(56) References Cited

U.S. PATENT DOCUMENTS

| | | | |
|---|---|---|---|
| 7,725,924 B2* | 5/2010 | Terao | H04L 63/083 726/28 |
| 9,594,587 B2* | 3/2017 | Brown | H04L 43/0817 |

(Continued)

FOREIGN PATENT DOCUMENTS

CN     107819651 B  *  9/2020  ............. G05B 15/02

OTHER PUBLICATIONS

Singh, Rayman P., et al., "It's Time to End Monolithic Apps for Connected Devices", Login, vol. 40, No. 5, (Oct. 2015), 29-35.

(Continued)

*Primary Examiner* — Lance Leonard Barry
*Assistant Examiner* — Mohammad Yousuf A. Mian
(74) *Attorney, Agent, or Firm* — Forsgren Fisher; Daniel A. Tysver; James M. Urzedowski

(57) ABSTRACT

Techniques and system configurations for generating and implementing recipes and scripts to enable the orchestration of actions, activities, and configurations within smart devices and device networks (including the Internet of Things "IoT" network topologies) are described herein. In an example, a method for smart device orchestration and configuration includes: obtaining an orchestration recipe that defines a sequence of actions to be performed among multiple types of smart devices; activating the orchestration recipe for use upon multiple smart devices associated with a user, based on at least one condition to perform the sequence of actions; associating the orchestration recipe with respective configurations of the multiple smart devices associated with the user; and initiating the orchestration recipe, to cause the sequence of actions to be performed with the multiple smart devices, including via cloud-based device services that control the multiple smart devices associated with the user.

20 Claims, 9 Drawing Sheets

(56) References Cited

U.S. PATENT DOCUMENTS

| | | | |
|---|---|---|---|
| 9,984,686 B1* | 5/2018 | Mutagi | G06F 3/167 |
| 10,116,513 B1 | 10/2018 | Sundaram | |
| 2013/0147623 A1* | 6/2013 | Somasundaram | H04N 21/478 726/4 |
| 2014/0244834 A1* | 8/2014 | Guedalia | H04W 4/21 709/224 |
| 2015/0019710 A1 | 1/2015 | Shaashua et al. | |
| 2016/0127145 A1* | 5/2016 | Fu | H04L 12/282 700/275 |
| 2016/0261931 A1 | 9/2016 | Fadell et al. | |
| 2016/0342906 A1 | 11/2016 | Shaashua et al. | |
| 2017/0054810 A1 | 2/2017 | Evans et al. | |
| 2017/0063611 A1 | 3/2017 | Sheba et al. | |
| 2017/0093593 A1* | 3/2017 | Yang | H04L 67/12 |
| 2017/0118499 A1 | 4/2017 | Karp et al. | |
| 2017/0139801 A1 | 5/2017 | Greenzeiger | |
| 2017/0186309 A1 | 6/2017 | Sager et al. | |

OTHER PUBLICATIONS

"Integrating with Muzzley", [online], [retrieved on Jul. 12, 2017]. Retrieved from the Internet: https://smarthome.muzzley.com/documentation, (Jul. 2017), 32 pgs.

"Orbweb Accelerates Device Makers to Go Beyond Hardware Manufacturing: GoToMyThings—SMAhome", (c) 2017 Messe Frankfurt New Era Business Media Ltd. [online]. Retrieved from the Internet: http://mysmahome.com/company/32260/orbweb-accelerates-device-makers-to-go-beyond-hardware-manufacturing-gotomythings/, (2017), 10 pgs.

"Stringify—Now the Whole Family Has Control", [online]. [retrieved on Jul. 12, 2017]. Retrieved from the Internet: https://www.stringify.com/now-the-whole-family-hascontrol-new-on-stringify/, (Jul. 2017), 8 pgs.

"Thington: Frequently Asked Questions", [online]. [retrieved on Jul. 12, 2017]. Retrieved from the Internet: https://thington.com/faq/index.html, (Jul. 2017), 7 pgs.

Kim, Ji Eun, et al., "Seamless Integration of Heterogeneous Devices and Access Control in Smart Homes", (2012), 8 pgs.

"Stringify Flow Basics", [online]. [retrieved on Jul. 12, 2017]. Retrieved from the Internet: https://www.stringify.com/stringify-flow-basics/, (Jul. 2017), 10 pgs.

Mar. 12, 2020 USPTO Office Action (U.S. Appl. No. 15/886,519).

Sajal K. Das etal. Designing Smart Environments: A Paradigm Based on Learning and Prediction, 2006, University of Texas at Arlington (Year: 2006).

Xiaojing Ye et al. A Framework for Cloud-based Smart Home, Dec. 2011, IEEE (Year: 2011).

\* cited by examiner

AUTOMATIC DEVICE ORCHESTRATION AND CONFIGURATION

RELATED APPLICATION

The present application is a continuation of U.S. Ser. No. 15/886,519, filed on Feb. 1, 2018, which is hereby incorporated by reference in its entirety.

TECHNICAL FIELD

Embodiments pertain to management and processing activities in a network-connected device information system. Some embodiments pertain to techniques to identify, establish, and update configuration settings for connected devices in various types of networks.

BACKGROUND

Smart home devices are becoming prevalent in many home settings. Whether in the form of a smart TV, sound system, curtains, refrigerator, oven, garage door, washing machine, dryer, coffee pot, light bulb, smoke detector, thermostat, or the like, users enjoy being able to monitor and control their smart home devices remotely from other devices. In this manner, a user can warm their home, lock their front door, start dinner, play music, monitor food levels, or the like, from a remote location within or outside the home. This adds convenience and saves time for individuals busy with other life activities. Such smart devices are commonly referred to as devices connected to the "interne of things" (IoT), with the IoT being generally defined as technology that enables the interconnection of everyday objects to send and receive data for the real-world use and operation of such objects.

Some smart device platforms enable coordination between monitored conditions and activities among multiple devices, for example, to turn on a smart light switch in another room of a house when a garage door opener receives a command to open. However, such coordination is often limited to the particular smart device ecosystem and the configuration capabilities that are exposed by a smart device manufacturer. The possibility of more advanced device orchestrations and actions involving multiple smart home devices has been limited to settings where complex setup and home automation or building control systems have been provided by professional installers. Accordingly, many home users operate individual smart devices using commands sent from separate software apps, and such smart devices are not involved in complex settings.

Further complicating smart home device use cases, are the many different manufacturers, service providers, and communication networks involved with different devices, as many smart home devices are simply incompatible or unable to talk or coordinate actions with one another. As a result, many smart home devices may be misconfigured or may conduct actions that are in conflict with one another, leading to user dissatisfaction and an inability to perform many real-world actions.

DETAILED DESCRIPTION

Figure 1:
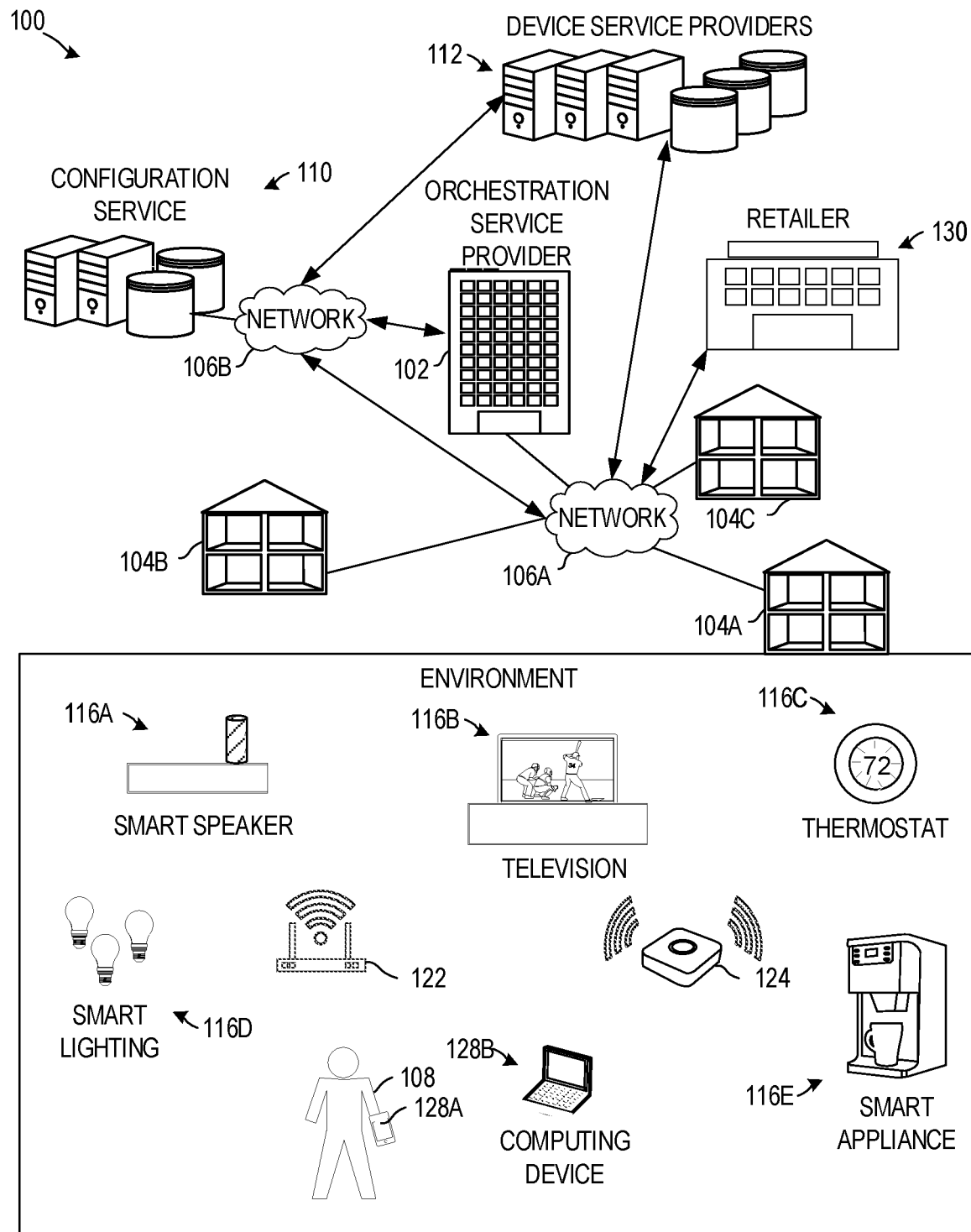
FIG. 1 illustrates smart device interactions in a real-world environment according to an example.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The following disclosure relates to the orchestration of actions, activities, and configurations within smart devices and smart device networks. The term "smart device" when used in the context of this disclosure refers to any device that has or performs some intelligent (e.g., electronically controlled, sensed, or actuatable) feature and is in connection with other devices and systems via a communications network, such as connectivity to other hosts including other edge devices and cloud services via Internet of Things (IoT) networks and topologies. Communication networks that may be utilized with such smart devices can include a personal area network (PAN), a local area network (LAN), a wide area network (WAN), the Internet, mobile telephone networks, plain old telephone (POTS) networks, and combinations of wired or wireless data network topologies (including IEEE 802.15.4/Zigbee, power line networks, Bluetooth, IEEE 802.11/Wi-Fi, 2G/3G, 4G LTE/LTE-A, or 5G networks). Thus, references to the "Internet of Things" or IoT may encompass any number of device-to-device, personal, local, or wide area network topologies.

Example features of such smart devices may include sensors, actuators, graphical displays, text or audio human-machine interfaces, and the like. Examples of smart devices include, but are not limited to televisions, cameras, sound systems, speakers and speaker/microphone combinations, audio or media player devices, small and large kitchen appliances such as refrigerators, ovens, coffee pots, and cooking tools, curtains or blinds, garage doors, washing machines, dryers, thermostats, smoke or water detectors, alarms, air filters, smart locks, pedometers, weight scales, pill dispensers, toothbrushes, personal health monitoring devices, lights or lighting controls, electric outlet or switch, automobiles (or other transportation vehicles), human-interactive control systems within such vehicles, or like devices. Some smart devices may include complex processing circuitry and logic, with capabilities approaching smartphones or computing systems; other smart devices may have very limited capabilities, and rely on remote processing instructions and logic. Further, a personal computer, tablet, or smartphone may be configured in some examples to operate as a smart device.

Some of the examples discussed herein are directed to techniques that enable orchestration and control of device actions and scenarios involving multiple smart devices, to enable enhanced control and functionality. Many types of smart devices require a user, installer, technician, or other controlling person to establish programming conditions and rules for operation. In an example, the following techniques enable a commercial entity (e.g., a smart device manufacturer, a retailer, an internet service provider, a media content provider) to collect and process smart device actions and events, to suggest the automatic use of smart device scenarios and orchestrations. Such scenarios and orchestrations may involve various logical rules and conditions that apply to a variety of types, manufacturers, and configurations of smart home devices. These logical rules and conditions may be scripted into automatically suggested "recipes" used for control of a smart device. These recipes may provide a script, orchestration, sequence, or other scenario or set of actions for the operation of certain actions among one or multiple devices.

As a simple example, a recipe developed for "TV watching mode" might include a coordination of a smart lighting device (e.g., to change the color and intensity of the lighting device to a hue and brightness that is appropriate for watching a screen), a smart speaker (e.g., to enter a do-not-disturb mode), a smart thermostat (e.g., to turn up the thermostat heat mode to two degrees above normal settings), and smart television (e.g., to utilize a display mode that is complimentary to the smart lighting). This recipe may be deployed and utilized even if each of the smart devices involve different manufacturers and control services, or if the smart devices involve a mix of network topologies and device capabilities. Further, this recipe may allow the control of the smart devices through multiple cloud service providers, such as in a scenario where an orchestrating service serves as an intermediary to ensures the performance of a certain device action with each cloud service provider.

As another example, a recipe may be developed for "Entering Home", which is automatically created by a configuration service as a recipe. For instance, the configuration service may identify a particular setting or state of a smart device (e.g., turn on a television to use a streaming provider, or turn on a smart speaker to play music from a particular channel) to occur after the use of another particular device or set of devices (e.g., occurs after lights in other rooms are switched off). The configuration service may monitor the occurrence of this sequence by a user, and automatically generate and suggest a recipe to automate the actions. Likewise, if similar actions are manually performed by a large number of users, the recipe to automate the actions may be offered to these large number of users and new users who are likely to perform the same activities.

As still another example, a recipe may be developed for "Turn Off All Lights" which is suggested by a configuration service as a recipe. For instance, this recipe may be offered as a generic, pre-scripted action to be offered to all users of a configuration service, even though virtually every user or home has a different number, type, and combination of lights. The configuration service may associate a generic, user-independent recipe to turn off all lights with specific configuration settings unique to each user, so that when a particular user selects and activates a recipe, the appropriate commands can be issued to all lighting units associated with the particular user. The configuration service may coordinate such actions among multiple device service providers and device platforms, via different cloud services, or via distributed device control hubs or gateways. In this fashion, generic recipes that perform common actions may be appropriately identified, suggested, and deployed to many different users.

The selection and use of automatically-identified and defined recipes may enable the automatic configuration of one or multiple smart devices among one or multiple smart device services based on desired conditions, rules, actions, and outcomes. The recipes discussed herein may be used with other features of a smart device service, including automated agent capabilities (e.g., via skills or interactions with Google Home, Apple Siri, Amazon Alexa, or Microsoft Cortana). For instance, the orchestration service provider may receive commands from an automated agent to create, update, launch, or remove the use of a recipe.

In certain examples, data from respective smart device users among multiple homes, families, and user accounts, may be organized, analyzed, and processed to identify new types of recipes and control use cases. For instance, data analysis, mining, aspects of artificial intelligence (such as machine learning models to identify patterns of usage) may be utilized to identify recipes applicable to families, businesses, or other groups of users. Such analysis, mining, and identification may also be used to automatically suggest and recommend recipes, and enact, update, or remove recipes, and to increase functionality of home automation and smart device usage. As is explained below, these examples may be integrated with a variety of types of smart devices, user interfaces, and deployment platforms. Further, the recipes and controls are not limited to in-home automation or appliance actions, but may be coordinated with the delivery and display of audiovisual content, software content, and like information.

FIG. 1 provides a system illustration 100 of smart device interactions among system entities in a real-world environment. In this illustration 100, various entities obtain relevant user, device, and service data to generate and deploy recipes and other smart device control actions within IoT environments. The depicted system includes an orchestration service provider 102 (e.g., manufacturer, retailer, internet service provider, media company, security company, etc.) that is connected to devices in a plurality of user environments 104A-104C via a network 106A (e.g., a wide area network). The user environment 104 is of any type that hosts or utilizes smart devices and includes but is not limited to single family residences, apartments, condos, commercial buildings, office buildings, strip malls, and the like. While only three environments 104A-104C are illustrated, numerous environments and settings are possible within any given networked system.

In each environment, a user 108 has control of or access to the electronics and smart devices within the environment. This user 108 may be the owner, manager, or administrator of the various devices; in some examples, the user 108 may be a guest, family member, or restricted user. In an example, the user 108 provides permission or credentials (e.g., an API (Application Programming Interface) key, password, etc.) to the orchestration service provider 102 to access information from electronics and devices within the environment 104A. In some examples, the orchestration service provider 102 may perform a network connection directly to devices within the environment 104A; in other examples, the orchestration service provider 102 may perform a network connection to a variety of device service providers 112 (e.g., cloud web services) that host network-accessible interfaces (e.g., cloud-based APIs) for IoT device monitoring and control. The orchestration service provider 102 may also coordinate with a configuration service 110 which stores or maintains the permission or credentials; the configuration service 110 may also maintain profiles and information related to the particular deployment of the types, characteristics, or preferences of smart devices, as associated with the user 108, the environment 104A, or accounts for such user or environment.

In further examples, the orchestration service provider 102 hosts a service that enables the user 108 to perform various aspects of device monitoring, control, and configuration, using recipes and device control scripts. In an example, a device control command to select or initiate a recipe may be sent to the orchestration service provider 102, which results in the orchestration service provider 102 sending various commands to the device service providers 112. In other examples, the device control command to select or initiate a recipe is sent from a computing device 128A, 128B of the user 108 to the device service providers 112, with the device service providers 112 being aware of the recipe for the user 108 based on information in the configuration service 110.

Information related to access, configuration, and usage of the smart devices for a specific environment (e.g., environment 104A) or user (e.g., user 108) may be collected and received by the orchestration service provider 102 and forwarded, as appropriate, via a network 106B to the configuration service 110 for processing and storage. The data in the configuration service 110 may be utilized to automatically identify, generate, or customize recipes and recipe actions for a particular user, group associated with a user, or group of users, building, environment, or group of buildings or environments. The configuration service 110 may generate and suggest the recipes on the basis of user performed actions, actions popular with similar users, actions popular on the types of devices, or the like. These recipes may be automatically made available to users, or made available after being customized and activated by respective users.

In some examples, the orchestration service provider 102 provides an API or other consumer interface to access the recipes, as the configuration service 110 provides back-end data to generate and determine the recipes. In other examples, the same entity may perform the roles of the configuration service 110 and the service provider 102, such as where actions performed by the configuration service 110 are coordinated with actions performed by the orchestration service provider 102.

The configuration service 110 may store configuration and recipe data in a data warehouse (not shown) after processing. The data collected by the configuration service 110 may include rules, conditions, and scenarios of devices, users, and recipes. Such information may also include smart device usage data such as usage time, usage duration, usage periods during a 24-hour period and/or other period, location data, device specific functioning such as temperature settings, power usage, sound level, and the like. The data collected by the configuration service 110 may also include, but is not limited to, user profile data such as user or account identifiers, demographic data like age, gender, residence, and the like, and user ownership data such as number of smart devices, types of smart devices, age of smart devices, and the like. Such information may also include vendor data, technical support or user assistance data, audiovisual content related to the smart device, and the like.

In an example, device control scenarios may be individually deployed for each environment 104 through user- or environment-customized recipes, via accounts or profiles accessible through the orchestration service provider 102, configuration service 110, device service providers 112, and other entities. In the example of FIG. 1 only environment 104A is shown as having the smart devices 116A-E, but this is for illustration purposes only. Additionally, while five smart devices 116A-E are illustrated, any number of smart devices, including only one and up to several hundred in instances where the environment is an office building, may be present. The smart devices illustrated in the environment 104A include a smart audio system 116A (e.g., smart speaker with an AI agent), smart TV 116B, smart thermostat 116C, smart lighting 116D, and smart appliance 116E. These smart devices are merely examples and the smart devices 116 may include any type of device, including the other IoT device examples discussed herein.

Each smart device 116A-E may include one or more processors and one or more memory devices, and communication circuitry to communicate with the device service providers 112, the orchestration service provider 102, a local hub, or other devices. For instance, in the example of FIG. 1, each smart device 116A-E is coupled to a Wi-Fi access point 122 or a communication hub 124 that transmits device data to the network 106A. Consequently, data obtained by each smart device 116A-E is communicated through the system networks 106A, 106B (in addition to other networks not shown) to and from the orchestration service provider 102, configuration service 110, and device service providers 112, for processing, organization, analysis, and use. Smart device data includes, but is not limited to device model number, installation date, owner name, geographic location, device capability and feature information, operation settings such as temperature settings, volume settings, wash settings, and the like, usage data including duration of use, periods of use, use parameters, and the like.

A mobile computing device 128A and secondary computing device 128B of the user 108 may also be connected in some examples to the smart devices 116A-E, directly through device-to-device communications (e.g., Bluetooth connections), through the local area network (e.g., via Wi-Fi access point 122), or through a wide area network (e.g., through network 106A to a cloud API of the device service providers 112). The mobile computing device 128A may be a smartphone, tablet, dedicated device (e.g., remote), wearable device, or other electronic device or medium that can be used to receive and transmit data. The secondary computing device 128B includes but is not limited to a second smartphone, dedicated device, wearable device, personal computer, laptop or tablet, or the like that is also able to transmit and receive data. Such devices 128A, 128B, or interfaces of such devices, may be tracked by the orchestration service provider 102 or the configuration service 110 for association with the smart devices 116A-E.

A plurality of third party vendors, such as retailer 130, may provide or supplement user data and device data, with operations of the orchestration service provider 102, the configuration service 110, or the device service providers 112. Through this connection, the orchestration service provider 102, for example, may receive vendor data about capabilities and features of available devices; the orchestration service provider 102, may also identify additional user devices and products available in the environment 104A or associated with the user. Other information to provide technical support, assistance, service, or like enhancements to device recipes and orchestration activities, may be obtained through the retailer 130 or other third parties.

Figure 2:
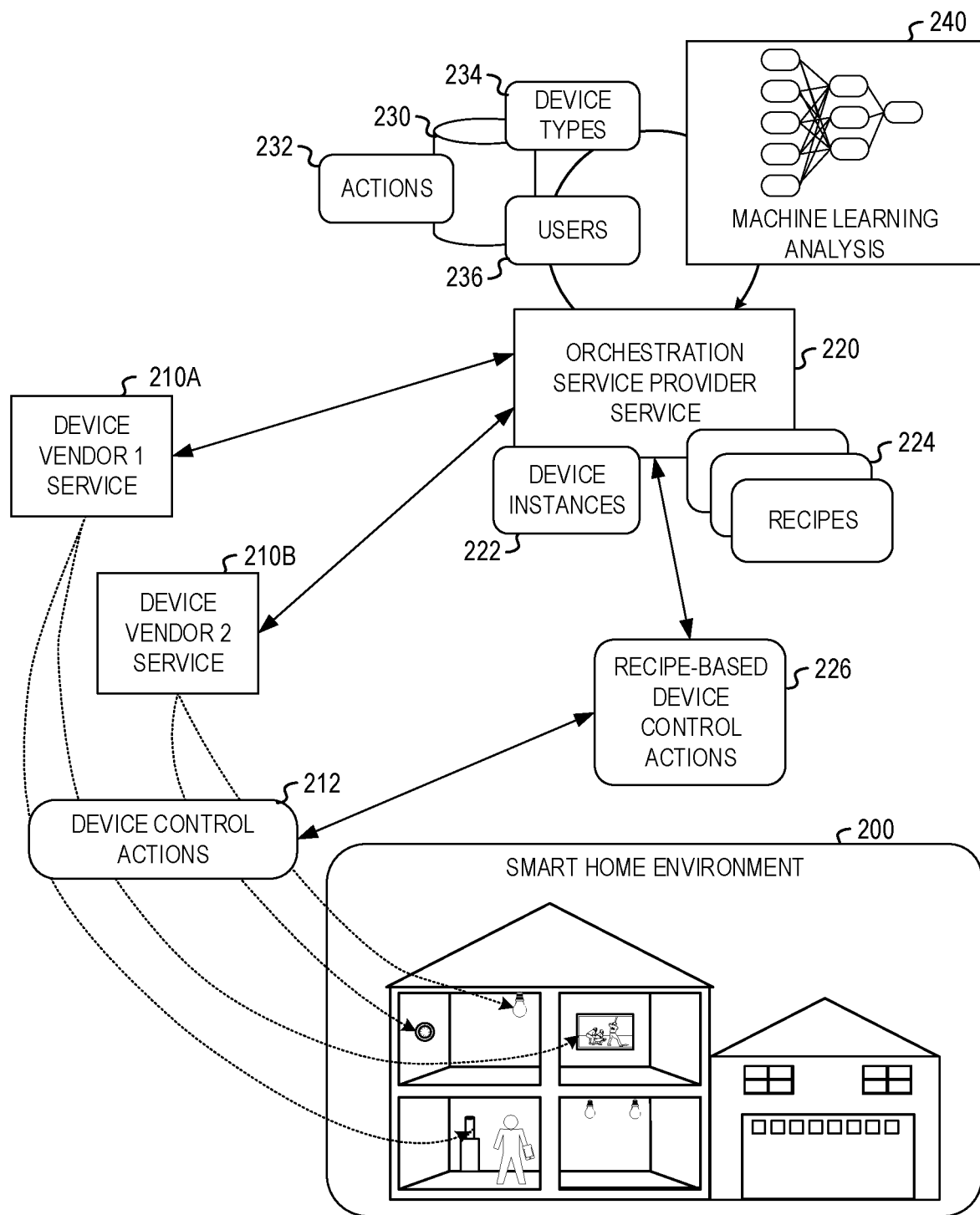
FIG. 2 illustrates a coordination of device control actions using recipes according to an example.

FIG. 2 illustrates an example coordination of device control actions using recipes. As a simplified example of the entities depicted in FIG. 1, a series of one or more device vendor services 210A, 210B (e.g., operated by the device service providers 112) enable control of devices in a smart home environment 200 using various device control actions 212. For instance, each device vendor service 210A, 210B may offer respective monitoring or control of the smart devices in the smart home environment 200, based on the features and capabilities of such devices. The monitoring or control may occur through the use of software apps, websites, smart remotes, or other interfaces, which provide communications between the respective vendor services 210 and a user (and user devices) in the smart home environment 200.

As also shown, an orchestration service provider service 220 (e.g., operated by the orchestration service provider 102) is in communication with the vendor services 210 for monitoring and control of the smart devices. The orchestration service provider service 220 utilizes information regarding device instances 222 to manage activities in multiple environments and users, including the smart home environment 200. The orchestration service provider service 220 further maintains multiple recipes 224 to provide coordinated device monitoring and control actions among multiple device types (and device instances 222).

In an example, the orchestration service provider service 220 links the various recipes 224 to the device instances 222 based on configuration information maintained in a data store 230. In an example, this configuration information may track various types of device actions 232, performable for various device types 234, on behalf of various users 236. Other relevant configuration information including capabilities, features, preferences, and settings, are not shown for simplicity, but may also be maintained and associated with the recipes 224. In other examples, this configuration information may be maintained by a separate party or service provider (e.g., the configuration service 110 discussed with reference to FIG. 1).

In an example, the recipes 224 may be automatically identified, updated, or removed, as a result of machine learning analysis 240 or other forms of artificial intelligence processing. For example, machine learning techniques may be used to determine the usage amount or sequence of usage for devices, or whether certain patterns of activity in devices are suitable for use in a recipe. Forms of neural network classifications, natural language processing, deep-learning analysis, time-series analysis, cluster analysis, and user activity analysis may be performed as part of the machine learning analysis 240.

Figure 3:
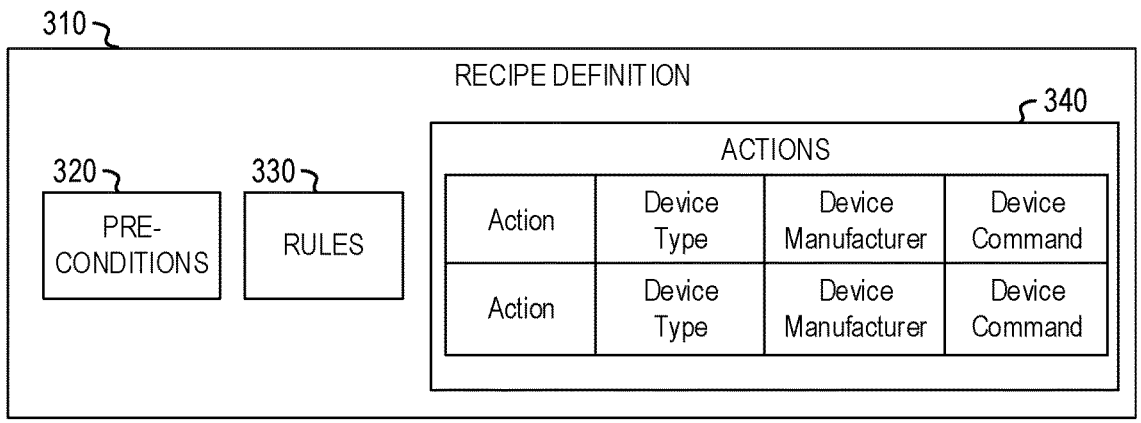
FIG. 3 illustrates a recipe for device control according to an example.

FIG. 3 illustrates an example of a recipe definition 310, deployable in a smart home environment (e.g., environment 104A, 200). A recipe, in an example, provides a set of logical rules, in the form of a script, task list, or other sequence of activities, that can be applied to device types, across different brands and implementations of devices. In this fashion, a recipe provides a way to generalize device orchestration actions (e.g., "turn off the TV", "turn on all lights on the first floor", etc.) across multiple users and user deployments, because the device-specific control actions to accomplish the actions for a particular user and set of user devices are linked in a configuration service.

In an example, a recipe may be represented by data fields in the recipe definition 310, to define a set of preconditions 320, rules 330, and actions 340. In an example, the actions 340 for a particular recipe may include specific implementations that are unique to a combination of an action, device type, device manufacturer, and device command. The depiction of the data fields for the actions 340 are provided as an example, however; in some examples, recipes may be linked to generic actions (e.g., turn off light, turn on appliance) with specific implementations being tied to the device type, device manufacturer, and device command format or command data.

In further examples, a recipe may be associated with group- or family-based permissions and capabilities. For example, the functionality performed by a recipe may be enabled on the basis of the type or characteristics of an end user (e.g., whether the end user is administrative user, a trusted family user, a child, an employee, a guest, etc.). Further, even if the device or device service provider does not support multiple permissions levels or types of user accounts, recipes may be introduced and managed by an orchestration service provider to be customized to user capabilities and permission sets. Thus, recipes may enable family or friend groups across multiple device ecosystems and deployments that would otherwise not be possible.

Figure 4:
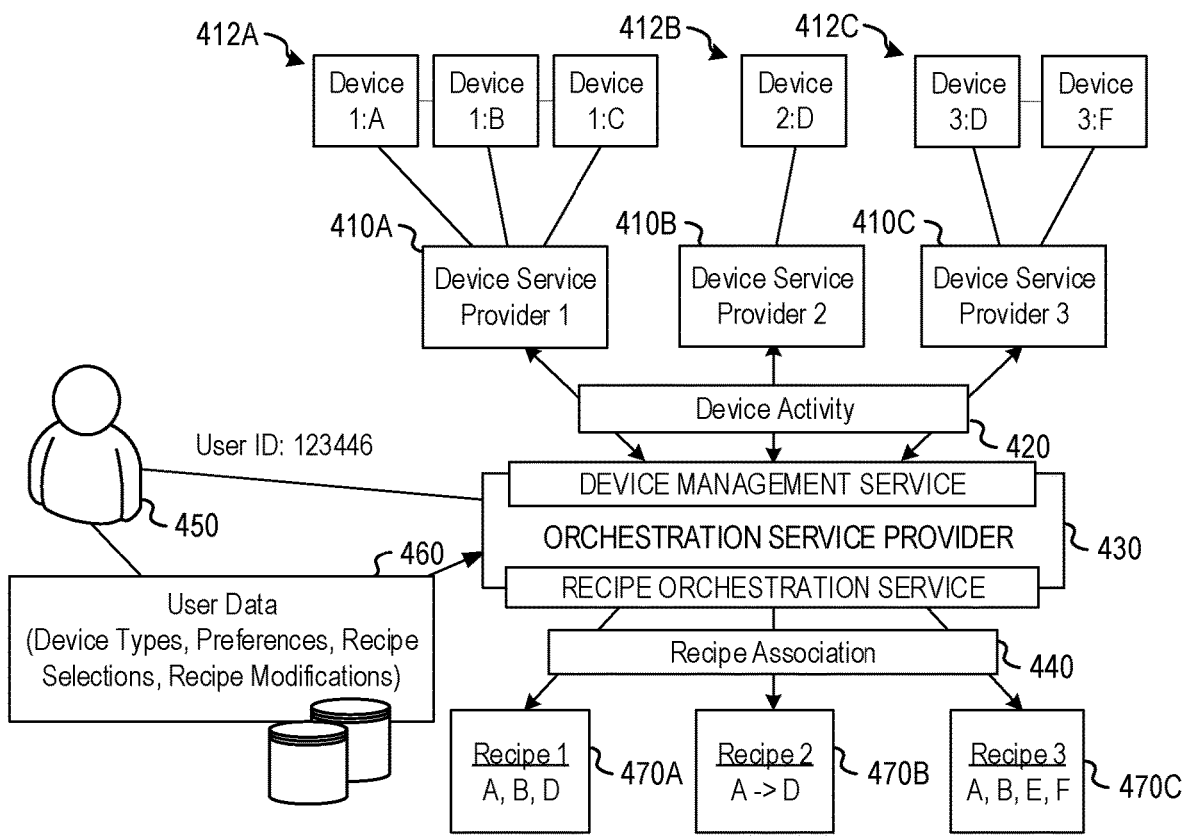
FIG. 4 illustrates a mapping between device activity and recipe coordination, in a smart device deployment, through an orchestration service provider, according to an example.

FIG. 4 illustrates an example mapping between device activity and recipe coordination, in a smart device deployment, through an orchestration service provider 430. As shown, the orchestration service provider 430 includes a device management service to coordinate (e.g., monitor, send, receive) device activity data 420, via respective device service providers 410A, 410B, 410C (e.g., cloud-based services that communicate with smart devices via IoT networks). The device service providers 410 are linked to various smart devices 412, in a deployment of devices for a particular user (e.g., user 450) in a particular setting (e.g., smart home environment 200 or dwelling 114).

As shown in FIG. 4, a first service provider 410A is linked to three devices 412A, each of which is a different device type (device types A, B, C, identified as 1:A, 1:B, 1:C, respectively). For instance, a first device may be a security camera, a second device may be a thermostat, and a third device may be a smoke detector. As also shown, a second service provider 410B is linked to one device 412B (device type D, identified as 2:D); a third service provider 410C is linked to two devices 412C (device types D and F, identified as 3:D and 3:F). In this example, different service providers may operate the same types of devices (e.g., two service providers that control smart lighting); although one instance of one device is shown for each device type per provider, there may be multiple devices of the same type from the same provider. As a result, it will be understood that a deployment for a particular user is likely to have variation in the type, number, and service provider of the smart devices.

The orchestration service provider 430 may be linked to a particular user 450 on the basis of an identifier, account, credential, or other link. The orchestration service provider 430 may maintain user data that tracks the device types, preferences, and characteristics of the user 450 or the smart device deployment (e.g., described above with reference to the FIG. 2). The orchestration service provider 430 may also maintain recipe data, in the form of recipe selections, modifications, and other settings or metadata for deployment of a recipe to a particular user or smart device deployment.

As shown, the orchestration service provider 430 may operate a recipe orchestration service, to establish recipe associations 440 with various device types. For instance, a first recipe 470A may involve device types A, B, D (e.g., turn down a thermostat and activate a security camera, when smart device enters a locked state); a second recipe 470B may involve a conditional action (e.g., when thermostat reaches over 72 degrees, turn off lights); a third recipe 470C may involve a like condition or sequence (turn down thermostat, turn on security camera, turn off lights, turn off television). As will be apparent, the recipes may involve actions among any combination of device types or device service providers (and device manufacturers, ecosystems, and types of networks).

In an example, the device control recipes may be linked to the type of device (a generic device), rather than to a specific device implementation or device instance. As a result, such device control recipes may be re-used by many different users and smart device deployments, as long as those users and deployments have device types with relevant capabilities. The use of generic devices also may enable the suggestion of new recipes across a broad set of users, as recipes are dynamically created, identified, and updated from a variety of smart device deployments, involving entirely different manufacturers or device service ecosystems.

With the present approach, device control recipes may be structured to work with different types of device capabilities, even as simple statuses (such as "on" or "off", "active", "inactive") are represented differently for devices from different manufacturers or platforms. Device control recipes may be mapped and managed based on capabilities and features available across vendors and hardware implementations, to more accurately depict at a device-type what a proper orchestration action should be.

Figure 5:
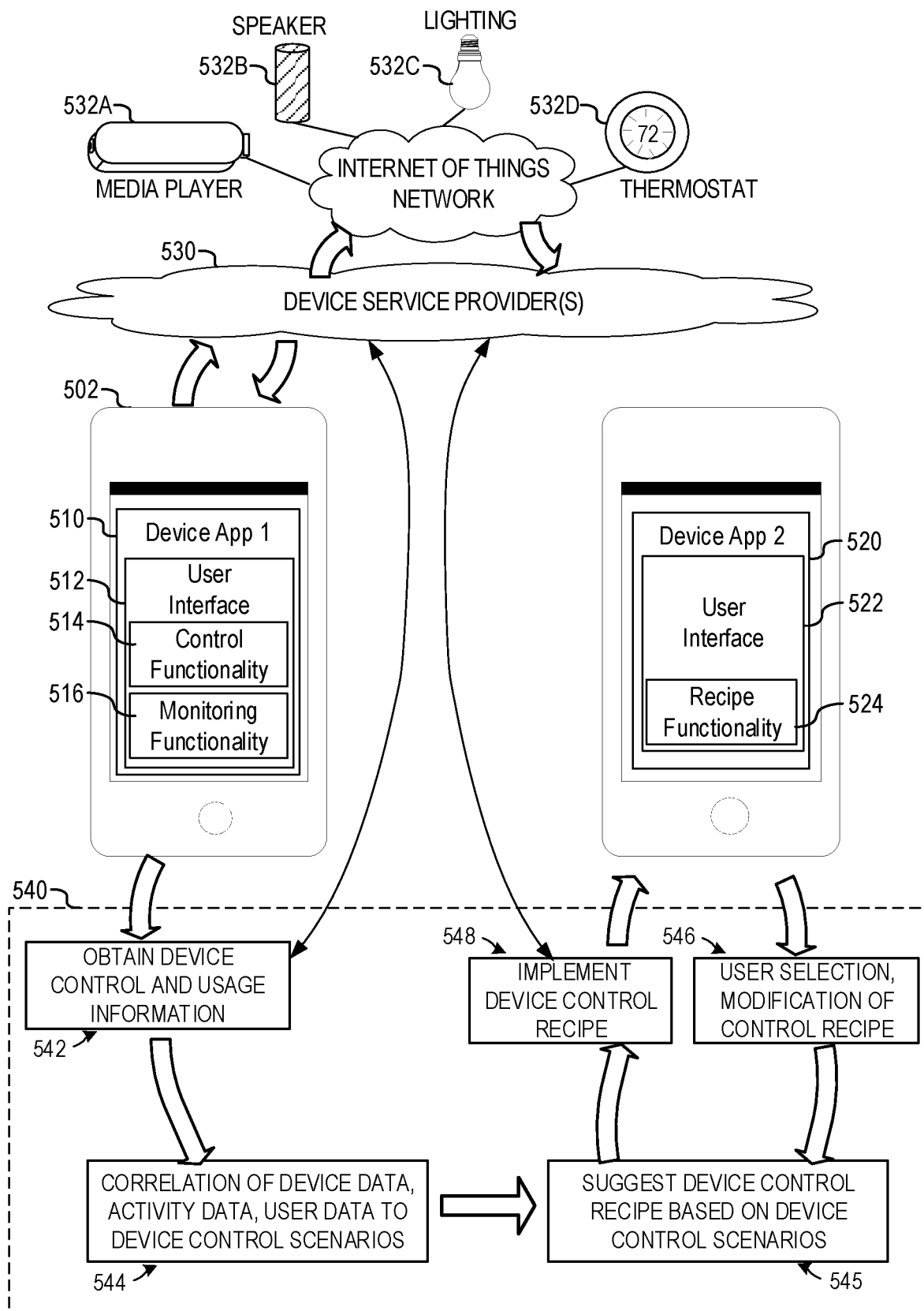
FIG. 5 illustrates a scenario of suggesting and implementing recipes for orchestrated device control, among client and service provider software applications, according to an example.

FIG. 5 illustrates an example scenario of suggesting and implementing recipes for orchestrated device control, among multiple client and service provider software applications. As shown, various smart devices 532 are operated in an internet of things network, via commands that are coordinated from various device service providers 530 (and hardware, such as gateways, hubs, relays, sensors, etc., provided by such device service providers 530).

As a typical example of device control and monitoring, a first software application 510 (e.g., app) operates on a mobile computing device 502, for control and monitoring of a particular device or set of devices. The first software application 510 may be a software application that is provided by the device manufacturer, or smart home service provider, and include a user interface 512 to provide control functionality 514 (e.g., to turn a device on or off, to change a device setting, etc.) and monitoring functionality 516 (e.g., to indicate a device mode, or a sensed device state, etc.). The control functionality 514 may result in various network commands that are sent via a local or wide area communications network (not shown), to the IoT network, via the device service providers 530, to ultimately interact with one or more of the smart devices 532. The monitoring functionality 516 may likewise receive data from the devices over the IoT network, via the device service providers 530.

The operational and configuration data from the smart devices may be collected by a recipe orchestration service 540 (operation 542), directly from the device service providers 530, from user inputs received via the mobile computing device 502, or via other methods. For example, a connection via a cloud service to the device service providers 530 may communicate the commands and status information regarding the various devices 532 to the recipe orchestration service 540; in other examples, operational and configuration data may be received or provided directly from the smart devices 532 to the recipe orchestration service 540.

In the recipe orchestration service 540, operations are performed on this operational and configuration data to correlate smart device data, activity data and user data to device control scenarios (operation 544), with such scenarios being used to match, create, or update recipes. Based on the correlation and association of device data with a particular user, device, activity, or other appropriate fields, a device control recipe may be selected to address particular device control scenarios (operation 545). In an example, this device control recipe may be selected or modified by user input (operation 546); in an example, this device control recipe may be implemented as a result of user selection or modification (operation 548).

In an example, a second software application 520 (e.g., operating on the device 502) may include a user interface 522 with recipe functionality 524 to allow a user to access, select, modify, and implement a device control recipe. In other examples, device control recipe may be automatically selected, updated, and implemented, on behalf of a user. In an example, information related to the device control recipe may be communicated from the recipe orchestration service 540 to the respective device service providers 530; in other examples, the recipe orchestration service 540 will call the device service providers 530 on demand, such as when the recipe orchestration service 540 detects certain conditions of the smart devices 532.

As shown, the two applications 510, 520 are shown as operating on a single user computing device (device 502). However, multiple forms of network-connected devices that are associated with the user (including an AI agent, personal computer, laptop, tablet, or the like, which may not directly include a smart device interface) may be used for aspects of the control functionality 514, the monitoring functionality 516, or the recipe functionality 524.

In further examples, recipes may be suggested and deployed to users for technical support or troubleshooting purposes. For example, if an orchestration service provider identifies that a particular device or device feature is not operable, a recipe may be deployed to bypass or remove the inoperable device or feature. Other aspects of device administration, troubleshooting, and adaptation may also be integrated with use of the recipe orchestration service 540, the software application 520, or the other platforms discussed herein.

Figure 6:
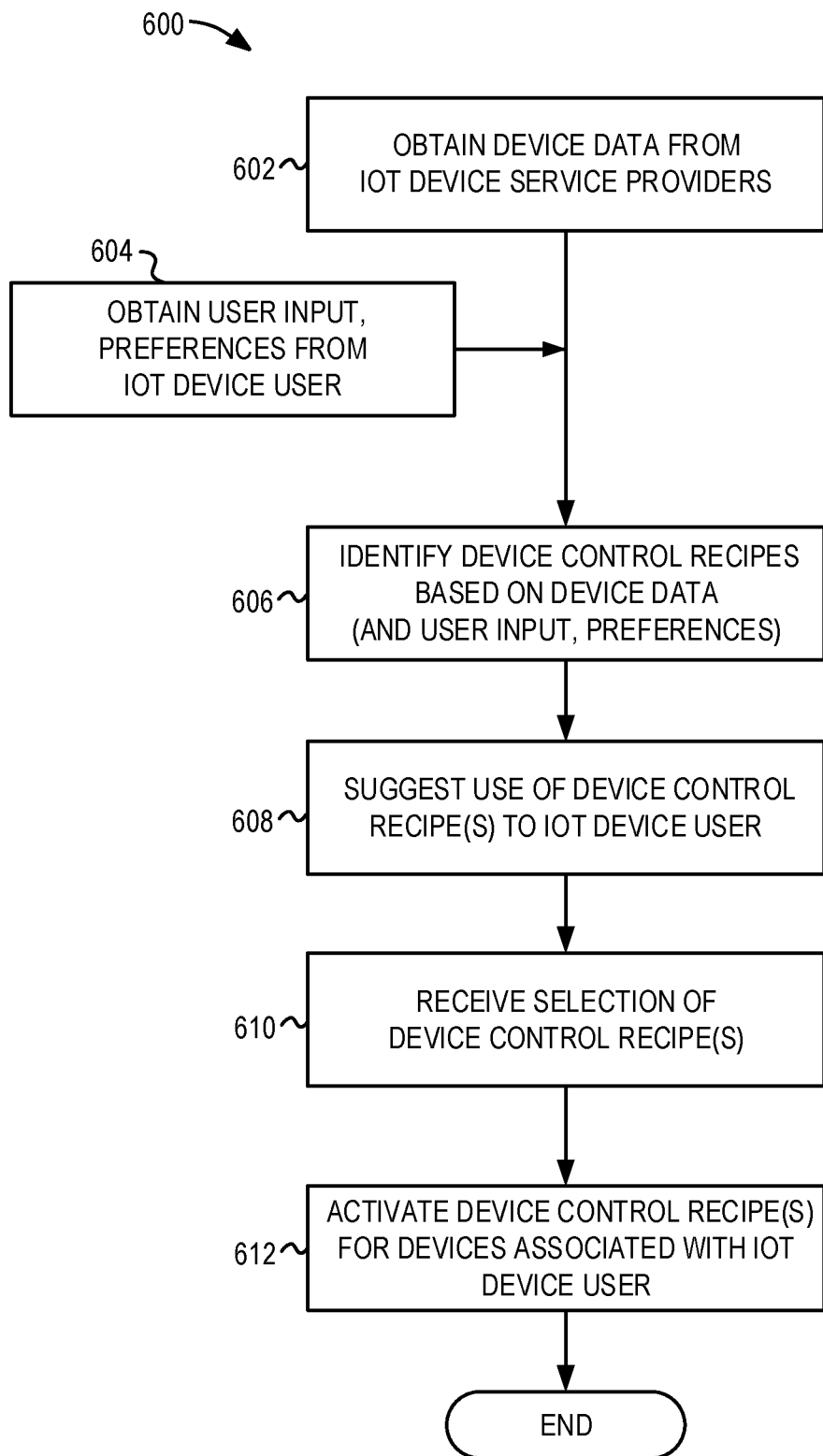
FIG. 6 illustrates a process performed by a system for identifying and suggesting recipes for orchestrated device control, according to an example.

FIG. 6 illustrates an example process, depicted by flowchart 600, performed by one or more computing systems or devices for identifying and suggesting recipes for orchestrated device control. The process of flowchart 600 may be implemented in hardware or software within one or more electronic systems (e.g., of orchestration service provider 102, or of hosting orchestration service provider service 220); and in some examples, the operations of flowchart 600 may be split across multiple entities. In some examples, the operations of the flowchart 600 may occur with human oversight or control; in other examples, the operations may be implemented with a computerized or electronic process that involves minimal or no human interaction.

As illustrated, the flowchart 600 for identifying and suggesting recipes for orchestrated device control includes operations to obtain (e.g., retrieve, access, or identify) device data from IoT device service providers, such as via a communication network, wireless network, or other electronically readable or communicable data source (operation 602). The device data may include a device identifier, device type information, device configuration information, device usage data, device parameter data, or the like. This device data may be processed by the electronic system (for example) and used for identifying, updating, or activating device control recipes for the associated devices, to implement recipes as discussed in the various examples above.

Optionally, the content retrieval includes operations to obtain (e.g., retrieve, access, or identify) user related data, such as via a communication network, wireless network, or other electronically readable or communicable data source (operation 604). This user-related data may include a user input, user preferences, a user identifier, a user profile, or the like. This user-related data may be processed by the computing system (for example) and also used in connection with identifying, updating, or activating device control recipes.

Based on the device data (and in some examples, the user data), one or more device control recipes may be identified (operation 606). The system then may suggest use of the one or more recipes (operation 608) to the IoT device user, administrator, group of users, etc. Such users may provide the system with a selection of one or more device control recipes (operation 610). In other examples, the selection of the one or more device control recipes may be automated or managed by a service or another user. The selected recipes are activated and associated with the respective devices, for use by the IoT device user (operation 612).

Figure 7:
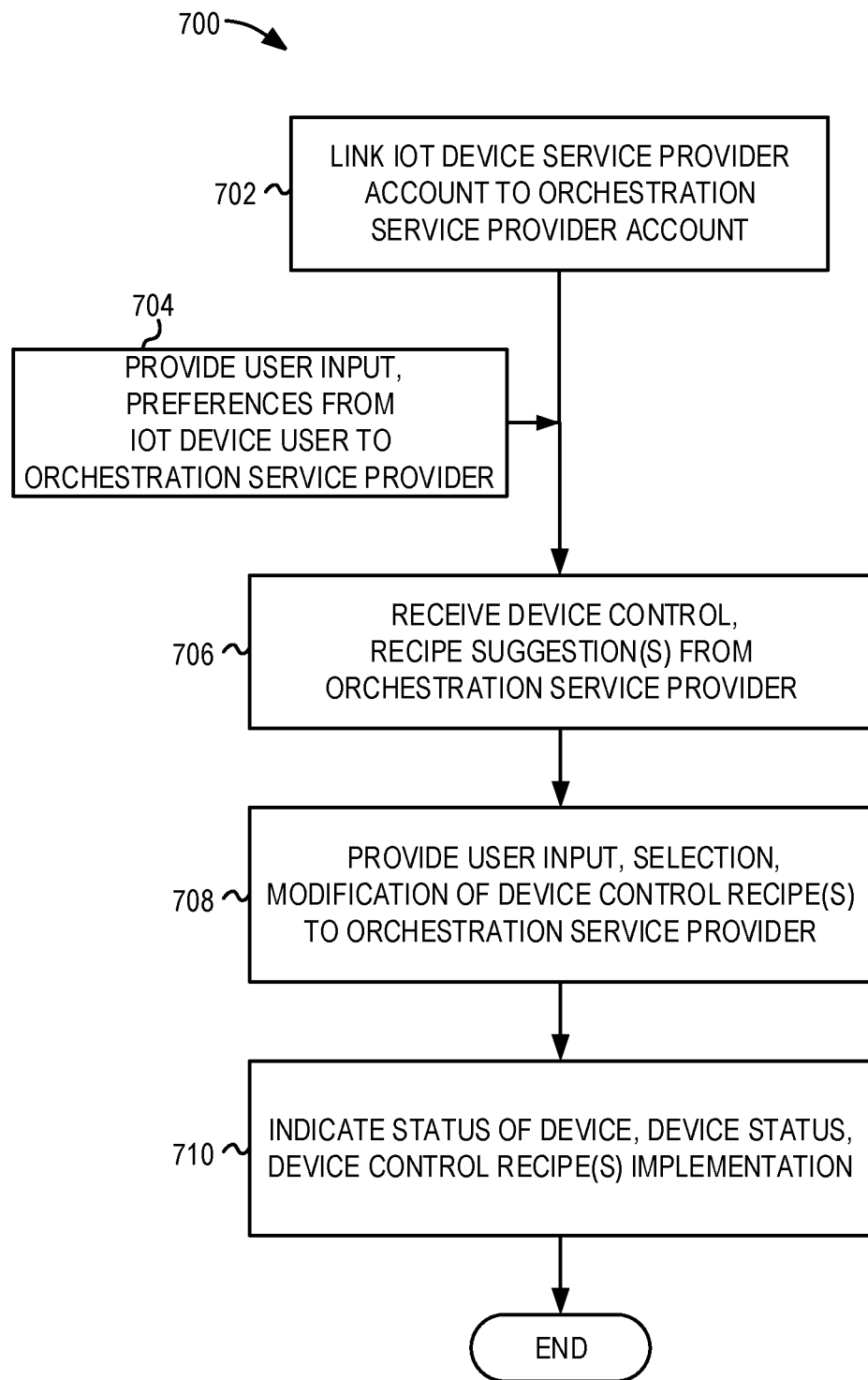
FIG. 7 illustrates a process performed by a system for suggesting and implementing recipes for orchestrated device control, according to an example.

FIG. 7 illustrates an example process, depicted by flowchart 700, performed by one or more computing systems or devices for suggesting and implementing recipes for orchestrated device control. The operations of the flowchart 700 may be implemented in hardware or software within one or more electronic systems (and as steps in substitute or addition to those of FIG. 7); and in some examples, the operations of flowchart 700 may be split across multiple entities. In some examples, the operations of the flowchart 700 may occur with human oversight or control; in other examples, the operations may be implemented with a computerized or electronic process (including aspects of artificial intelligence or automated pre-programming) that involves minimal or no human interaction.

In an example, the operations of the flowchart 700 may be performed by user-accessible interfaces or user-operated software. As illustrated, the flowchart 700 for suggesting and implementing recipes for orchestrated device control includes operations, coordinated by a user, to link one or more accounts of an IoT device service provider (or, multiple service providers), to an account of an orchestration service provider (operation 702). In connection with the account of the orchestration service provider, various user data, such as user input, preferences, configuration settings, related to the IoT device user, may be provided to the orchestration service provider (operation 704).

Based on the linked accounts and information, device control and recipe selections are obtained (and received, downloaded, accessed) from the orchestration service provider (operation 706). A user may then provide user input, selection, modification, and other changes, to the orchestration service provider, for one or more of the device control recipes (operation 708). In response to this input or other implementation details, the system may indicate a status of the device, device status, and device control recipe(s) implementation (operation 710). This information may be provided via a user interface, API, or other mechanism.

Figure 8:
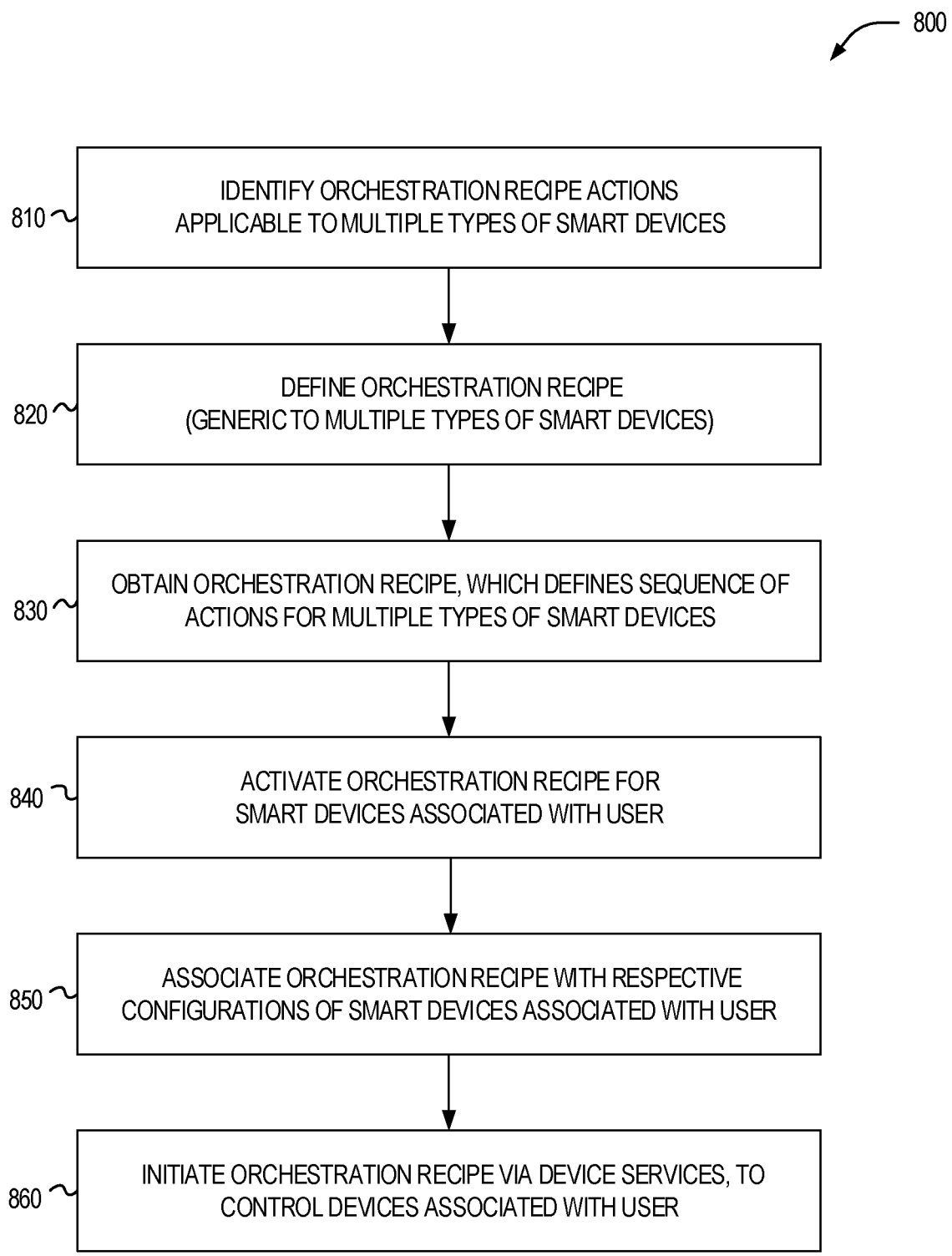
FIG. 8 illustrates a flowchart of n process performed for smart device orchestration and configuration, performed by a smart device management service, according to an example.

FIG. 8 illustrates a flowchart 800 of an example process performed for smart device orchestration and configuration, performed by a smart device management service. The flowchart 800 specifically illustrates a sequence of operations (which may vary in order or condition), that includes: identifying orchestration recipe actions applicable to multiple types of smart devices (operation 810); defining the orchestration recipe (operation 820), for an orchestration recipe that is generic to multiple types of smart devices; obtaining (e.g., accessing, receiving) the orchestration recipe (operation 830), with the orchestration recipe defining a sequence of actions to be performed among the multiple types of smart devices; activating the orchestration recipe for use upon multiple smart devices associated with a user (operation 840), with the orchestration recipe defining at least one condition to perform the sequence of actions with the multiple types of smart devices; associating the orchestration recipe with respective configurations of the multiple smart devices associated with the user (operation 850); and initiating the orchestration recipe (operation 860), to cause the sequence of actions to be performed with the multiple smart devices associated with the user, such as where the sequence of actions is performed via one or more cloud-based device services that control the multiple smart devices.

In a further example, combinable with the operations of flowchart 800, the sequence of actions performed by the orchestration recipe includes performing a first action on a first type of smart device and performing a second action on a second type of smart device, and wherein the at least one condition includes a condition detected by a third type of smart device.

In a further example, combinable with the operations of flowchart 800, the orchestration recipe may involve operations of further customizing the recipe, in response to input provided from the user, the customizing including changing at least one action of the sequence of actions to be performed with the multiple smart devices, or changing at least one condition to perform the sequence of actions.

In a further example, combinable with the operations of flowchart 800, the orchestration recipe may involve operations to further define the orchestration recipe, the orchestration recipe being generic to multiple implementations of the multiple types of smart devices, such that the multiple implementations include at least two implementations of a particular device type provided from among multiple manufacturers. For instance, defining the orchestration recipe may include identifying, from data associated with multiple smart device deployments unrelated to the user, the sequence of actions being performed on the multiple smart device deployments, such that the multiple smart device deployments include device types corresponding to the multiple types of smart devices used in the orchestration recipe. Also for instance, the identifying of the sequence of actions may be performed using an analysis of device usage data from among the multiple smart device deployments, such that the analysis of the device usage data is performed using at least one artificial intelligence algorithm.

In a further example, combinable with the operations of flowchart 800, activating the orchestration recipe for use upon multiple smart devices associated with the user includes obtaining characteristics of the multiple smart devices associated with the user, and customizing the orchestration recipe based on: manufacturer information of the multiple smart devices, device capability information of the multiple smart devices, or available types of smart devices in an environment associated with the user.

In a further example, combinable with the operations of flowchart 800, the orchestration recipe may include characteristics customized to usage of the smart devices by a group of persons associated with the user, such that the smart devices are deployed in a residential environment associated with the user.

In a further example, combinable with the operations of flowchart 800, the smart device management service may associate an identifier of the user with multiple identifiers used to access respective devices of the multiple smart devices, such that the respective devices of the multiple smart devices are accessed via respective network services.

In a further example, combinable with the operations of flowchart 800, the multiple types of smart devices include at least two device types provided from among any of the smart device types or forms described herein.

The preceding examples of flowcharts 600, 700, and 800 may be performed in any combination, from the perspective of methods or processes performed by one or multiple computing devices. Further, the preceding examples of flowcharts 600, 700, and 800 may be implemented by: at least one machine readable medium including instructions, which when executed by device (e.g., computing device, smart device, server device) hardware, cause the device hardware to perform or implement any of the examples; a computing system comprising processing circuitry and a storage device, comprising instructions (including instructions in the form of respective executable modules, components, or logic), that when executed by the processing circuitry, cause the processing circuitry to perform any of the examples; an apparatus comprising means for performing any of the examples; or other system or method implementations discussed herein.

Figure 9:
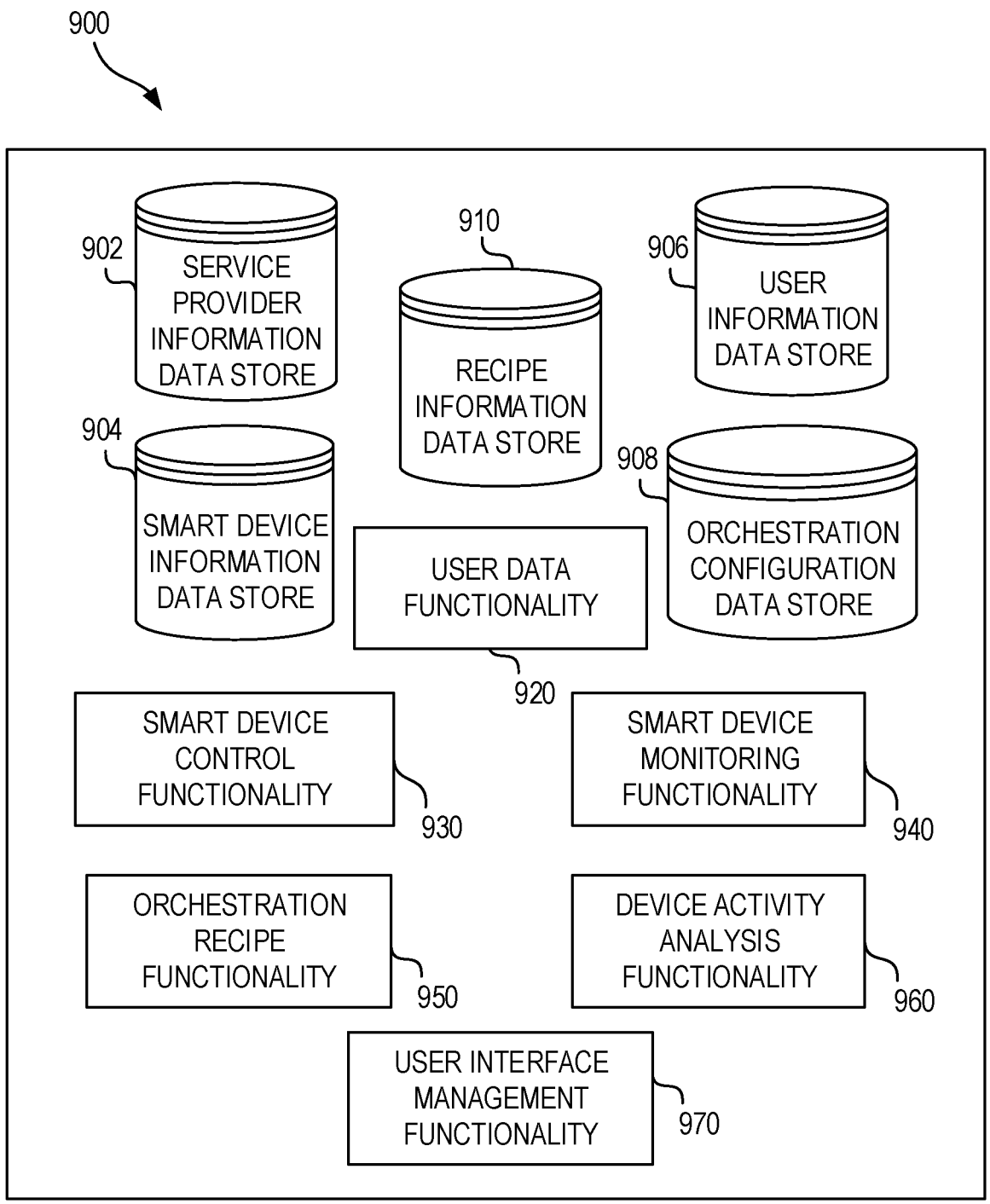
FIG. 9 illustrates a block diagram of example computing system components adapted for enabling automated management and orchestration of devices in an Internet of Things device network, according to an example.

FIG. 9 illustrates a block diagram of a computing system 900 with processing components adapted for interaction with a media network according to a further example. The computing system 900 may include a processor, memory, operating system, and user input interface to operate and provide interaction with the IoT media platform and associated devices, systems, and implementations. The computing system 900 may be implemented within one or a plurality of computer system devices, at one or multiple locations, and be implemented in connection with features of remote or cloud-based processing functions.

The computing system 900 is configured to implement a plurality of modules or components for, data retrieval, content retrieval, and content display according to the functionality described above. The computing system 900 is also configured to implement and maintain a plurality of data stores for storing data used to provide the functionality described above. A description of the following modules and data sources follows, but it will be understood that functionality and operation of the various data sources and modules may be consolidated into fewer or expanded into additional data sources or modules.

The computing system 900 is depicted as including: a service provider information data store 902 for storing or maintaining information related to connectivity, actions, or capabilities, to be performed with device service providers; a smart device information data store 904 for storing and maintaining smart device information such as device identifier, device usage data, device profile data, and the like; a user information data store 906 for storing user identifiers, user profile information, and other characteristics associated with a user or group of users; a orchestration configuration data store 908 for storing or maintaining information related to related device actions, capabilities, constraints, for use in device orchestrations; and a recipe information data store 910 for storing and maintaining information on the characteristics, composition, and attributes of respective recipes. Additional data stores may also be used to persist, maintain, and receive data involved in the generation, activation, and use of recipes to perform the functions described herein.

The computing system 900 is also depicted as including a series of modules or components (e.g., implemented with aspects of hardware and software) providing service-based functionality for smart device orchestration and configuration. The modules or components depicted include: user data functionality 920 used for providing and obtaining information related to users associated with smart device deployments; smart device control functionality 930 used for implementing control aspects and commands of respective smart devices; smart device monitoring functionality 940 used for implementing monitoring aspects and commands of respective smart devices; orchestration recipe functionality 950 for establishing, activating, updating, modifying, and removing orchestration recipes; device activity analysis functionality 960 used for determining characteristics of device activities in connection with recipe management and usage; and user interface management functionality 970 used for cause the control, access, or operation of the orchestration recipes and related functionality. Although the system 900 is depicted from a service-based perspective, other client-side components (not depicted) but may be included or coordinated with the system 900, or in other client-side systems.

Aspects of artificial intelligence used with the present systems, as discussed above, may include various aspects of machine learning. For instance, a machine learning model may be implemented from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Aspects of training and optimized learning for the machine learning model may be implemented with use of the presently described data characteristics, user or administrative feedback, or like information.

Embodiments used to facilitate and perform the techniques described herein may be implemented in one or a combination of hardware, firmware, and software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 10:
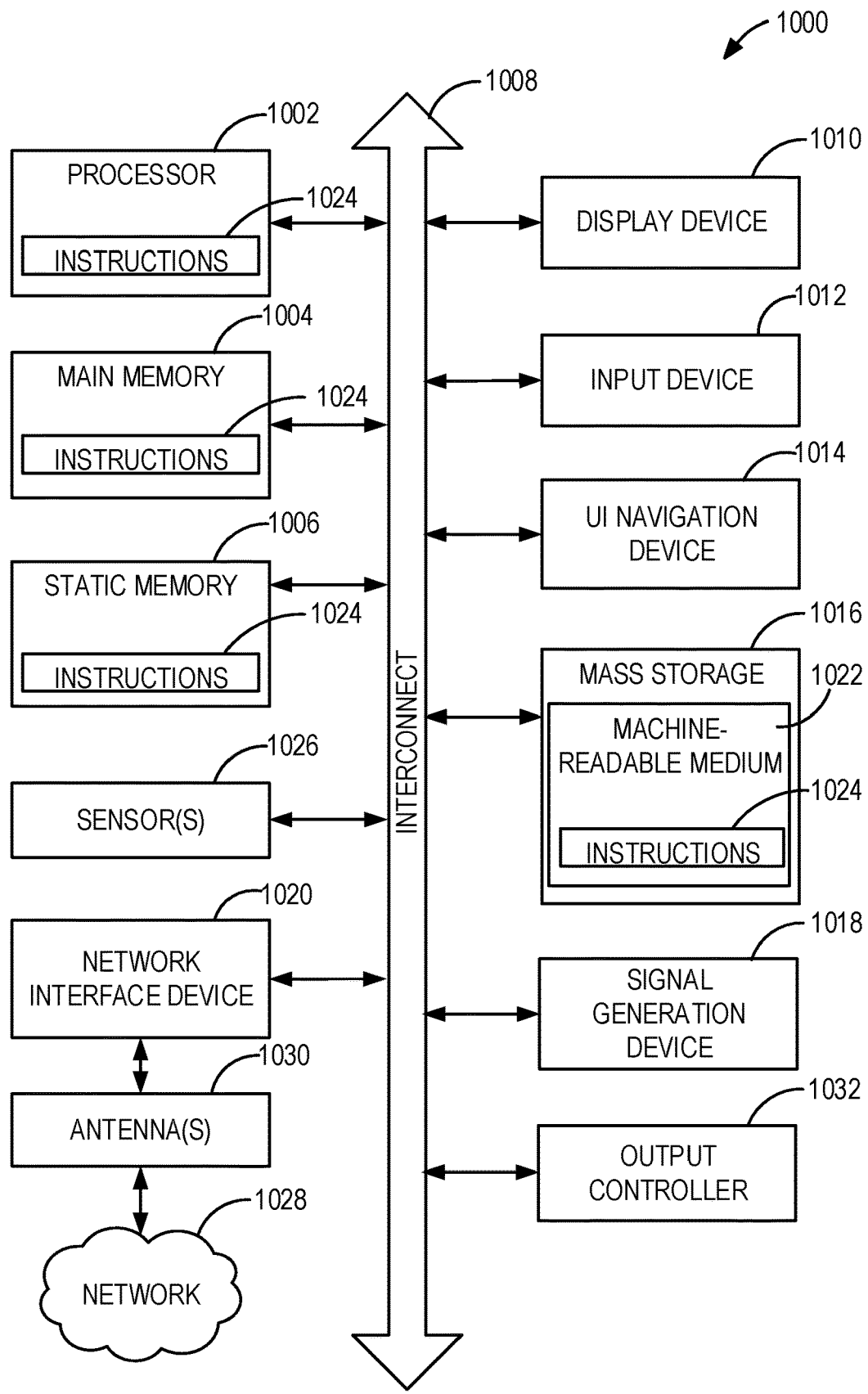
FIG. 10 is a block diagram illustrating operational components of a computing system upon which any one or more of the methodologies herein discussed may be run.

FIG. 10 illustrates a block diagram illustrating a machine in the example form of a computer system 1000, within which a set or sequence of instructions may be executed to cause the machine to perform any one of the methodologies discussed herein, according to an example. Computer system machine 1000 may be embodied by the electronic processing systems implemented by the services and service providers 102, 110, 112, 210, 220, 410, 430, 530, 540; the smart devices 116, 128, 532, or communication devices 122, 124; the subsystem(s) implementing the data stores 230, 460, 902, 904, 906, 908, 910; the subsystem(s) implementing the various modules or components 920, 930, 940, 950, 960, 970; or any other electronic processing or computing platform described or referred to herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via an interconnect 1008 (e.g., a link, a bus, etc.). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touchscreen interface and touchscreen display. The computer system 1000 may additionally include a storage device 1016 (e.g., a drive unit), a signal generation device 1018 (e.g., a speaker), an output controller 1032, a network interface device 1020 (which may include or operably communicate with one or more antennas 1030, transceivers, or other wireless communications hardware), and one or more sensors 1026, such as a global positioning system (GPS) sensor, compass, accelerometer, location sensor, or other sensors.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible (e.g., non-transitory) medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1028 using a transmission medium via the network interface device 1020 utilizing any one of a number of well-known transfer protocols (e.g., HTTP). Examples of communication networks include a personal area network (PAN), local area network (LAN), a wide area network (WAN), the Internet, mobile telephone networks, plain old telephone (POTS) networks, and wireless data networks (with examples of such PANs, LANs, and WANs, occurring among implementations of 802.15.4/Zigbee, Bluetooth, Wi-Fi, 2G/3G, 4G LTE/LTE-A, or 5G networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the configurations recited by the claims. Each of the examples in the claims may stand on its own, or may be combined in any permutation or combination with any one or more of the other examples provided below or throughout the present disclosure.

What is claimed is:

1. A method for smart device orchestration comprising:
   a) defining a plurality of generic device types for smart devices, with each generic device type including a generic feature, the generic features of the plurality of generic device types comprising generic status values and generic actions;
   b) defining a plurality of recipes based on interactions between generic device types, wherein the recipes define a sequence of generic actions to be performed based upon detecting a generic status value, the plurality of recipes including a first recipe that defines a first sequence of generic actions performed by a first generic device type and a second generic device type, wherein the first sequence of generic actions is triggered by a first generic status value of a third generic device type;
   c) collecting configuration information for users, the configuration information defining specific devices utilized by the users, wherein each specific device is of one generic device type, the configuration information further defining specific implementation details for acquiring the generic status values and performing the generic actions for the specific devices, further wherein the configuration information comprises:
      i) first configuration information for a first user concerning specific devices in use at a first user location, the first configuration information identifying at least a first specific device of the first generic device type, a second specific device of the second generic device type, and a third specific device of the third generic device type;
      ii) second configuration information for a second user concerning specific devices in use at a second user location, the second configuration information identifying at least a fourth specific device of the first generic device type, a fifth specific device of the second generic device type, and a sixth specific device of the third generic device type;
      wherein the specific implementation details for acquiring the generic status values and performing the generic actions on the first, second, and third specific devices differs than the specific implementation details for acquiring the generic status values and performing the generic actions on the fourth, fifth, and sixth specific devices;

d) after collecting the configuration information, comparing the configuration information to the plurality of recipes to identify a first set of suggested recipes for use at the first user location and a different, second set of suggested recipes for use at the second user location, wherein the first and second set of recipes both including the first recipe;

e) transmitting through a first user interface the first set of suggested recipes to the first user;

f) upon receiving a first request from the first user to implement the first recipe, using the first configuration information to determine and implement the specific implementation details to perform the first sequence of generic actions on the first specific device and the second specific device when triggered by the first generic status value of the third specific device; and g) transmitting through a second user interface the second set of suggested recipes to the second user; and h) upon receiving a second request from the second user interface to implement the first recipe, using the second configuration information to determine and implement the specific implementation details to perform the first sequence of generic actions on the fourth specific device and the fifth specific device when triggered by the first generic status value of the sixth specific device.

2. The method of claim 1, wherein the first specific device of the first generic device type is made by a different manufacturer than the fourth specific device of the first generic device type.

3. The method of claim 1, wherein the first generic device type is a lighting device, the second generic device type is a thermostat, and the third generic device type is a door lock.

4. The method of claim 1, wherein the plurality of generic device types comprise: a television, a media player, a kitchen appliance, a door lock, a thermostat, a smoke detector, a lighting device, a lighting control, an electric outlet, and an electric switch.

5. The method of claim 1, wherein an orchestration computing device receives the first and second request, further wherein the orchestration computing device causes the first sequence of generic actions to be performed using cloud-based device services that control the specific devices in use at the first and second user locations.

6. The method of claim 5, wherein the cloud-based device services that control the specific devices in use at the first user location are different than the cloud-based device services that control the specific devices in use at the second user location.

7. The method of claim 6, wherein the first specific device is made by a different manufacturer than the fourth specific device, further wherein the first specific device utilizes a different cloud-based device service than the fourth specific device.

8. The method of claim 7, wherein the first user and a third user are both associated with the first user location, further wherein the first set of suggested recipes further comprise a second recipe, still further wherein permissions are established that allow the first and third user to implement the first recipe through the orchestration computing device while allowing only the first user to execute the second recipe through the orchestration computing device.

9. The method of claim 8, wherein the second recipe is not triggered by a generic status value but is executed upon request by the first user.

10. The method of claim 8, wherein the orchestration computing device establishes permissions to implement recipes based on group-based permission levels, wherein the first user is a member of a first group and the third user is a member of a second group, further wherein members of the second group do not have permission to execute the second recipe.

11. The method of claim 6, wherein the first configuration information further comprises account access information to the cloud-based device services that control the specific devices in use at the first user location.

12. The method of claim 1, further comprising the step of receiving instructions from the first user interface to customize the first recipe.

13. The method of claim 12, wherein the instructions change the first sequence of generic actions defined by the first recipe.

14. A method for smart device orchestration comprising:
a) defining a plurality of generic device types for smart devices, with each generic device type including a generic feature, the generic features of the plurality of generic device types comprising generic status values and generic actions;

b) defining at an orchestration computing device a plurality of recipes based on interactions between generic device types, wherein the recipes define a sequence of generic actions to be performed, the plurality of recipes including a first recipe;

c) collecting, at a configuration computing device, configuration information for users, the configuration information defining specific devices for the generic device types, the configuration information further defining specific implementation details for acquiring the generic status values and performing the generic actions for the specific devices;

d) after collecting the configuration information and at the orchestration computing device, comparing the configuration information for a first user to the plurality of recipes to identify a first set of suggested recipes for the first user;

e) transmitting through a first user interface the first set of suggested recipes to the first user; and f) upon receiving a first request from the first user to operate a first recipe, and at the orchestration computing device, using the first configuration information to determine and execute the specific implementation details to perform a first sequence of generic actions defined by the first recipe on specific devices operating at a first user location.

15. The method of claim 14, wherein the orchestration computing device implements the first sequence of generic actions using cloud-based device services that control the specific devices operating at the first user location.

16. The method of claim 15, wherein the first user and a second user are both associated with the first user location, further wherein the first set of suggested recipes further comprise a second recipe, still further wherein permissions are established that allow the first and second user to execute the first recipe through the orchestration computing device while allowing only the first user to execute the second recipe through the orchestration computing device.

17. The method of claim 16, wherein the orchestration computing device establishes permissions to implement recipes based on group-based permission levels, wherein the first user is a member of a first group and the second user is a member of a second group, further wherein members of the second group do not have permission to execute the second recipe.

18. The method of claim 15, wherein the first configuration information further comprises account access information to the cloud-based device services that control the specific devices in use at the first user location.

19. A method for smart device orchestration comprising:
a) accessing, at a computing device, configuration information that tracks a plurality of device types, wherein a first generic device type has a first plurality of generic actions and a second generic device types has a second plurality of generic actions;
b) accessing, at the computing device, a plurality of recipes comprising:
  i) a first recipe defining a first sequence of generic actions to be performed based on interactions between a first set of generic device types;
  ii) a second recipe defining a second sequence of generic actions to be performed based on interactions between a second set of generic device types;
c) collecting, at the computing device, user information that identifies, for a plurality of users, specific devices of the generic device types;
d) comparing the user information for a first user to the plurality of recipes to select the first recipe for the first user by identifying that a first plurality of specific devices identified in the user information for the first user comprise devices that are of the first set of generic device types;
e) comparing the user information for a second user to the plurality of recipes to select the first recipe for the second user by identifying that a second plurality of specific devices identified in the user information for the second user comprise devices that are of the first set of generic device types;
f) transmitting the first recipe to the first user and to the second user;
g) identifying both:
  i) first specific implementation details for performing the first sequence of generic actions for the first plurality of specific devices identified in the user information for the first user, and
  ii) second specific implementation details for performing the first sequence of generic actions for the second plurality of specific devices identified in the user information for the second user,
  wherein the first specific implementation details differ from the second specific implementation details; and
h) upon receiving a first-user request from the first user to operate the first recipe, executing the first specific implementation details to perform the first sequence of generic actions defined by the first recipe on the first plurality of specific devices identified in the user information for the first user; and
i) upon receiving a second-user request from the second user to operate the first recipe, executing the second specific implementation details to perform the first sequence of generic actions defined by the first recipe on the second plurality of specific devices identified in the user information for the second user.

20. The method of claim 19, wherein the first sequency of generic actions includes determining status values.

* * * * *